Figure 1:
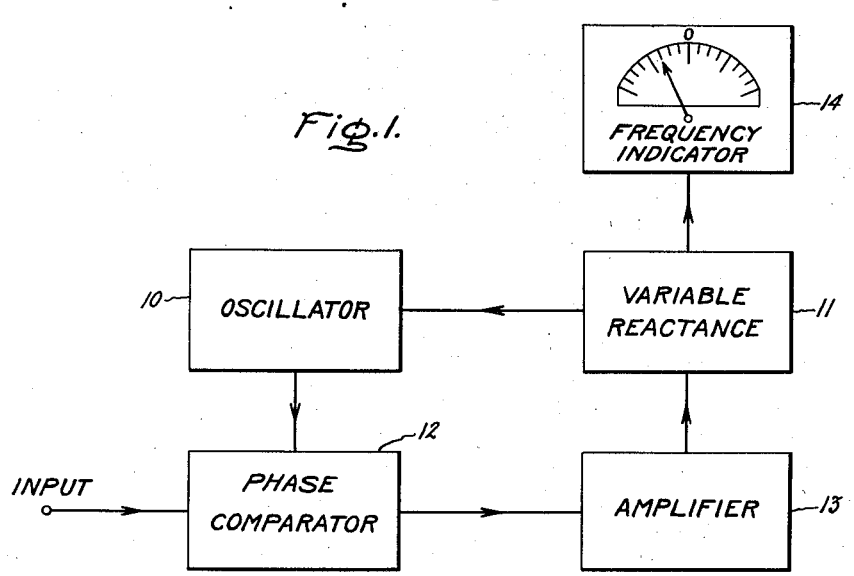

May 26, 1959   H. R. SUMMERHAYES, JR   2,888,643
APPARATUS FOR DETERMINING FREQUENCY
Filed April 29, 1955

Inventor:
Harry R. Summerhayes, Jr.,
by Merton D Moore
His Attorney.

United States Patent Office 2,888,643
Patented May 26, 1959

2,888,643

APPARATUS FOR DETERMINING FREQUENCY

Harry R. Summerhayes, Jr., Schenectady, N.Y., assignor to General Electric Company, a corporation of New York Application April 29, 1955, Serial No. 504,765

6 Claims. (Cl. 324—82)

This invention relates to apparatus for determining and indicating the frequency of a radio frequency carrier wave and, more particularly, to apparatus for determining and indicating the frequency of such a wave which is amplitude modulated in accordance with a desired signal.

The measurement of the frequency of a carrier wave amplitude modulated in accordance with a desired signal presents a number of special problems. Many frequency measuring circuits heretofore known have embodied components that are responsive to amplitude changes as well as to frequency changes; therefore, it has been necessary to remove the amplitude modulation from the carrier wave before applying the wave to the frequency measuring circuit. The amplitude modulation may be removed by the use of limiting circuits; but unless such circuits are very carefully designed, frequency modulation of the wave may be introduced which causes undesirable fluctuations of the frequency measuring device and may even cause errors in the average frequency measured.

It has been proposed to generate an unmodulated wave by means of a local oscillator which is "locked in" at the frequency of the incoming modulated wave. The local oscillator frequency may then be measured by conventional frequency indicating equipment, the modulation problem having been removed. However both the local oscillator and the frequency discriminator have frequency sensitive elements such as tuned circuits which are subject to drift or failure, and the circuit may be inherently difficult to align and maintain in alignment.

A primary object of the present invention is to provide apparatus for measuring and indicating the frequency of an amplitude modulated radio frequency carrier wave, which obviates the above-mentioned difficulties by embodying components that are substantially insensitive to variations in amplitude of the carrier wave and by employing only one principal frequency sensitive element.

Another object is to provide such apparatus which is adapted to indicate the departure of the frequency of an amplitude modulated radio frequency carrier wave from a predetermined value.

A further object is to provide a frequency measuring apparatus which may be adapted to provide an alarm if the unknown carrier wave frequency lies outside a predetermined range of frequencies.

Apparatus constructed in accordance with the invention which attains the objectives set forth may comprise a local oscillator having a frequency determining element for causing the oscillator to produce oscillations having a predetermined frequency, and a variable reactance connected into the frequency determining element of the oscillator for varying the operating frequency of the oscillator from its predetermined value. The output of the local oscillator and the radio frequency wave whose carrier frequency is to be measured are supplied to phase comparison means for producing an output potential whose polarity and amplitude are related to the phase difference between the carrier wave and the oscillations produced by the local oscillator. The output of the phase comparison means is utilized to control the variable reactance whereby the local oscillator frequency is made to equal the unknown frequency of the amplitude modulated carrier wave. Means are provided for utilizing the reactance of the variable reactance as an indication of the frequency of oscillations of the local oscillator and hence of the frequency of the radio frequency carrier wave. Means are also provided to energize an alarm when the frequency of the carrier wave lies outside a certain range.

The novel features which are believed to be characteristic of the invention are set forth with particularity in the appended claims. The invention itself, however, both as to its organization and method of operation, together with further objects and advantages thereof, may best be understood by reference to the following description taken into conjunction with the accompanying drawing, in which Fig. 1 is a block diagram of apparatus constructed in accordance with the invention; and Fig. 2 is a circuit diagram of apparatus embodying the invention.

Referring to Fig. 1 of the drawing, apparatus embodying the invention comprises a local oscillator 10 having therein a frequency determining element, whereby the oscillator can provide oscillations having a predetermined known frequency. A variable reactance, which may be an electronic reactance tube 11, is connected in circuit relationship with the frequency determining element of the oscillator 10 in order to vary the reactance of the frequency determining elements and hence vary the frequency of the oscillations of the oscillator 10 from the predetermined value. The radio frequency carrier wave, whose frequency is to be determined, and the output of the oscillator 10 are supplied to a phase comparator 12 which provides output potential that varies in polarity and amplitude as a function of the phase difference or frequency difference between the carrier wave and the oscillations of the local oscillator. The output of the phase comparator is amplified by a conventional amplifier 13 and is supplied to the variable reactance to control the value of that reactance. An indicator 14 or other utilization means is connected to respond to the value of the variable reactance. The indicator 14 may be calibrated in terms of frequency because the departure of the frequency of oscillations of the local oscillator 10 from the predetermined value is a function of the reactance of the variable reactance 11.

In effect, the apparatus of the invention comprises a servo system which operates to maintain the frequency of oscillations of the local oscillator 10 at the frequency of the input radio frequency carrier wave. The amount of reactance that must be introduced by the variable reactance 11 in order to vary the frequency of oscillations of the local oscillator from the predetermined frequency to that of the carrier wave is a measure of the difference between the unknown frequency of the carrier wave and the predetermined frequency characteristic of the frequency determining element of the local oscillator.

Figure 2:
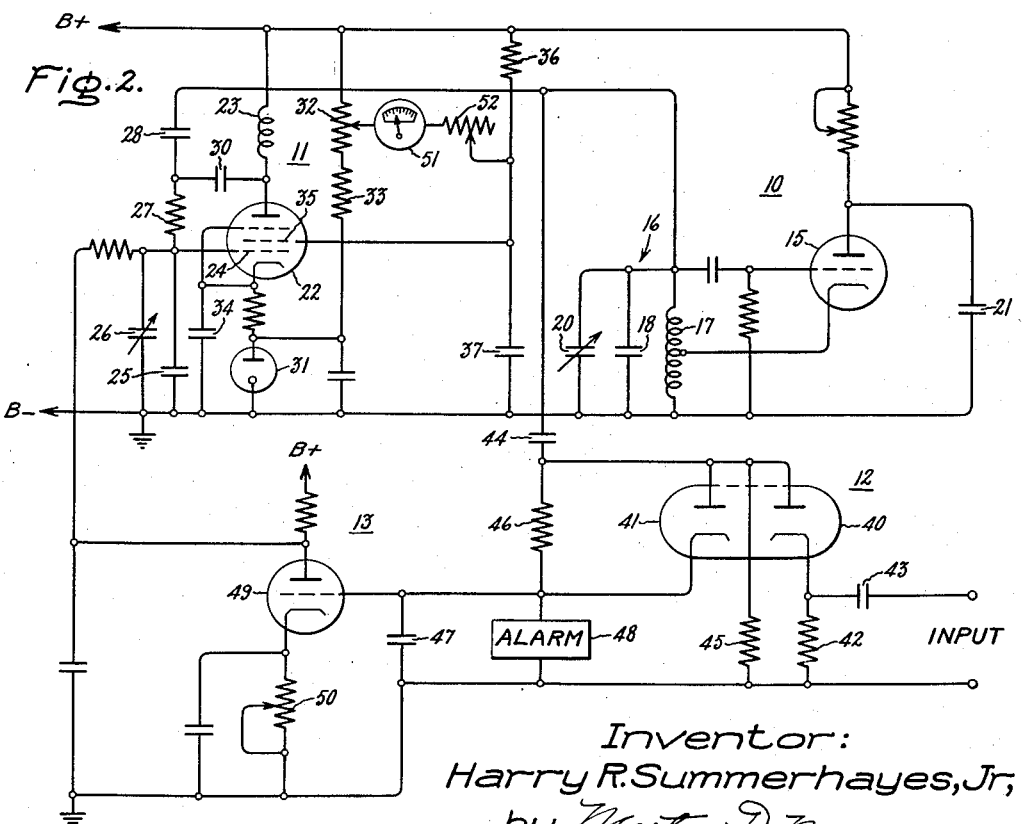

Referring now to the circuit diagram of Fig. 2, it is seen that the apparatus comprises four principal sections which are designated by the same reference numerals as the corresponding blocks in the diagram of Fig. 1. The local oscillator 10 is of the conventional type known as a Hartley oscillator and comprises an electron discharge device 15 and a frequency determinating element or circuit 16. The frequency determining circuit 16 comprises an inductance 17, a fixed capacitor 18, and a variable capacitor 20 connected in parallel to provide the usual tuned circuit. The anode of the discharge device 15 is connected to a source of positive potential (not shown), the positive terminal of which is designated by the character B+, and the grounded negative terminal of which is designated B−. The anode of discharge device 15 is grounded for radio frequency alternating current through a capacitor 21. The feedback necessary to sustain oscillations is provided between the cathode and the control grid through the tuned frequency determining circuit 16. The operation of an oscillator of this type is well known in the art, and a detailed description thereof is believed to be unnecessary.

Connected in parallel with the frequency determining circuit of the oscillator 10 is a variable reactance 11 which, in the present case, is a conventional electronic reactance discharge device circuit of a type well known in the art. The circuit comprises a pentode electron discharge device 22 whose anode is connected through an inductance 23 to the positive terminal of the source of operating potential. The control grid 24 of the discharge device 22 is connected to ground through a fixed capacitor 25 and a variable capacitor 26 in parallel therewith and is also connected to the frequency determining element of the local oscillator 10 through a resistance 27 and a blocking capacitor 28. The anode of the discharge device is connected to the juncture of resistor 27 and capacitor 28 through a blocking capacitor 30.

In order that the control grid 24 of the discharge device 22 may be operated at a relatively high positive potential with respect to ground, for a reason to be pointed out hereafter, the cathode of the discharge device is maintained at a positive potential with respect to ground by means of a voltage regulator tube 31. The voltage regulator tube 31 forms part of a series-connected voltage divider circuit between the positive terminal of the source of operating potential and ground which also includes potentiometer 32 and resistance 33. The cathode is also by-passed to ground by a capacitor 34 so that radio frequency oscillations do not appear thereon.

The screen grid 35 of the pentode discharge device 22 is connected to the positive terminal of the source of operating potential through a resistor 36, and any radio frequency oscillations appearing thereon are shorted to ground through a capacitor 37.

The values of the resistor 27 and the capacitors 25 and 26 are so chosen that at the frequency of oscillation of the local oscillator 10, the reactance of the capacitors is small compared to the resistance of resistor 27. Therefore, the current flowing through blocking capacitor 30, resistor 27 and capacitors 25, 26 is substantially in phase with the anode voltage of the discharge device 22. The current flowing through capacitors 25 and 26 develops a voltage thereacross which lags the current by substantially 90 degrees and thus lags the anode voltage of the discharge device by substantially 90 degrees. The voltage across capacitors 25 and 26 also appears on the control grid 24 of the discharge device and causes the anode current to have a component that is substantially 90 degrees out-of-phase with the anode voltage. Thus, because components of the current and voltage are substantially 90 degrees out-of-phase with each other, the discharge device 22 appears to the frequency determining circuit 16 as a reactance. The value of the reactance, of course, is determined by the amount of current flowing through the discharge device, which varies with the direct current potential of the control grid 24 of the device. The range of the reactance introduced by the circuit may be varied by adjustment of variable capacitor 26.

In order to vary the amount of reactance introduced into the frequency determining circuit 16 by the variable reactance 11 to cause the frequency of the oscillations of the local oscillator 10 to equal that of the amplitude modulated carrier wave, a phase comparator 12 is provided to control the variable reactance in accordance with the phase or frequency difference between the local oscillator oscillations and the amplitude modulated carrier wave. In the present case, the phase comparator 12 comprises a pair of diode rectifiers 40 and 41. The amplitude modulated radio frequency wave of unknown carrier frequency is supplied across a resistor 42 in the cathode circuit of the rectifier 40 through a blocking capacitor 43, and the oscillations generated by the local oscillator 10 are supplied to the anode of the rectifier 40 through a capacitor 44. A resistor 45 shunts the rectifier 40. The oscillations from the local oscillator 10 are also supplied to the anode of diode rectifier 41 which has a resistor 46 connected across the rectifier and a capacitor 47 connected from the cathode of the rectifier to ground. Rectifiers 40 and 41 are connected as conventional peak detectors in which the capacitors 44 and 47 are charged through a short time constant circuit including the diode rectifiers and discharge through a long time constant circuit including resistors 45 and 46. An audio frequency sensitive device, such as an alarm 48, may also be connected across the capacitor 47.

Because the local oscillator output is placed on the anode of the rectifier 40, and the amplitude modulated carrier wave is placed on the cathode, a direct current potential appears across resistor 45 due to the rectification provided by rectifier 40, with the direct current potential being proportional to the peak value of the vector difference of the locally produced oscillations and the carrier wave applied to the rectifier. The oscillations of the local oscillator 10 also appear across the resistor 45 but are of no particular consequence in the present application. The voltage appearing across the resistor 46 shunting the rectifier 41 is proportional only to the peak value of the output oscillations of the local oscillator 10 because the amplitude modulated carrier wave is not supplied to the rectifier 41. Hence the potential appearing across capacitor 47 is equal to the difference between the potentials developed across resistors 45 and 46 which are proportional to the vector difference of the peak values of the oscillations produced by the local oscillator and the amplitude modulated radio wave and to the peak values of the oscillations of the local oscillator, respectively.

The operation of the phase comparator may be more easily understood if it is assumed that the oscillations of the local oscillator 10 are of considerably greater amplitude than the amplitude modulated input carrier wave oscillations, and that the two oscillations have the same frequency but have various phase relationships. For example, when the two oscillations are approximately in phase, the peak value of the vector difference between the two oscillations is less than the peak value of the oscillations produced by the local oscillator. Hence the direct potential produced across resistor 45 is less than that produced across resistor 46, and the difference between these two potentials, which appears as a potential across capacitor 47, is positive with respect to ground. As the phase relationship between the two input oscillations to the phase comparator approaches 90 degrees, the peak value of the vector difference of the two oscillations approaches the peak value of the local oscillator oscillations, and the potential appearing across capacitor 47 approaches zero. Then, as the phase difference between the two input oscillations to the comparator increases beyond approximately 90 degrees, the peak value of their vector difference becomes greater than the peak value of the local oscillator oscillations and the potential appearing across the capacitor 47 becomes negative with respect to ground and increases as the phase difference between the oscillations approaches 180 degrees. As the phase difference between the two input oscillations to the comparator varies through 360 degrees, the potential appearing across capacitor 47 varies sinusoidally, and has its maximum positive and negative values with respect to ground when the comparator input oscillations have phase differences of approximately zero degrees and 180 degrees and is zero when the phase differences are approximately 90 degrees and 270 degrees.

The ouput of the phase comparator varies as a sinusoidal function of the phase difference between the local oscillator oscillations and the amplitude modulated radio frequency oscillations, and the function has maximum slope at the points where the output of the comparator is zero. At these points, the two input oscillations to the comparator differ substantially in phase (approximately 90 degrees or 270 degrees). For these reasons, the output of the phase comparator is little affected by the modulation of the amplitude modulated carrier wave oscillations but is substantially changed by departures from the predetermined phase relationship between the two oscillations. This is particularly true if the amplitude of the local oscillator output is several times that of the amplitude modulated carrier wave oscillations. It is pointed out that the input oscillations to the comparator are not exactly 90 degrees or 270 degrees out-of-phase when the comparator output is zero, because peak value of the vector difference of the oscillations at those peak relationships is not exactly equal to the peak value of the local oscillator output. However, as the amplitude of the local oscillator output is made larger relative to the amplitude modulated carrier wave, the phase differences when the output of the comparator is zero approach 90 degrees and 270 degrees.

Although the output of the local oscillator and the amplitude modulated carrier wave have been referred to in the foregoing description of the comparator as differing in phase, it is understood that they may differ in frequency, and the description has been made in terms of phase difference only for ease of explanation.

The potential appearing across capacitor 47 is amplified by a conventional direct current amplifier 13 comprising an electron discharge device 49 having a variable resistor 50 in its cathode circuit for adjusting the cathode bias of the discharge device. The output of the amplifier is connected directly from the anode of discharge device 49 to the control grid 24 of the discharge device 22 without the use of blocking capacitors to permit continuous control of the reactance circuit 11. As previously pointed out, the cathode of the discharge device 22 is maintained at a positive potential by voltage regulator 31, so the control grid 24 may be directly coupled to the anode of discharge device 49.

When the amplitude modulating carrier wave oscillations and the oscillations of the local oscillator have different frequencies, the output of the phase comparator 12, which appears across capacitor 47, is an alternating current potential having a frequency equal to the difference in frequency between the two input oscillations to the comparator. That signal is amplified by the amplifier 13 and placed on the control grid 24 of the variable reactance discharge device 22 as a direct current bias. As the bias of the control grid 24 is varied by the output from amplifier 13, the reactance of the reactance circuit 11 is varied, as previously explained. The varying reactance connected across the frequency determining element 16 of the local oscillator 10 causes the frequency of oscillations of the local oscillator to vary, and those oscillations are continuously compared to the amplitude modulated carrier wave oscillations by the phase comparator 12. When the frequency of the oscillations of the local oscillator equals that of the amplitude modulated carrier wave oscillations, the output of the phase comparator becomes constant, and the local oscillator is "locked in" at the frequency of the amplitude modulated input wave. Of course, the apparatus of the invention operates as a servo system, whereby there is an output from the phase compartor 12 at all times except when the unknown frequency of the input carrier wave is such that the output of the amplifier 13 for zero input so biases the variable reactance circuit 11 that the local oscillator 10 produces oscillations having that unknown frequency.

It is apparent to those skilled in the art that the reactance introduced into the frequency determining circuit 16 of the local oscillator by the variable reactance circuit 11 can vary only within certain limits. Those limits are primarily a function of the characteristics of the pentode discharge device 22 and the values of the capacitors 25 and 26. Sufficient reactance change may be provided by the variable reactance to vary the frequency of the local oscillator by approximately 5–10 kilocycles above and below the center frequency of the local oscillator frequency range when that center frequency is of the order of 500 kilocycles. Of course, as the center frequency of the range is varied throughout the radio frequency spectrum, the range itself will change, being wider at high frequencies than at low frequencies.

If the carrier frequency of the amplitude modulated input wave lies outside the frequency range of the local oscillator controlled by the variable reactance, the local oscillator, of course, cannot "lock in" at the input carrier wave frequency. In that case, the output of the phase comparator 12 is a continuous alternating current potential having a frequency equal to the difference between the local oscillator and input wave frequencies. That potential, whose frequency generally lies within the audio range, energizes the alarm 48 connected across the phase comparator output. The alarm 48 may comprise a conventional device, such as an audio amplifier and loudspeaker, to make audible the output signal from the phase comparator, or may comprise other conventional devices to give an audible or visible signal when the frequency of the amplitude modulated carrier wave lies outside the frequency range of the local oscillator as controlled by the variable reactance circuit 11.

The time constant of the circuit, including the amplifier 13 and the variable reactance 11, must be short enough to lock the oscillations of the local oscillator into synchronism at the predetermined phase relationship to the input carrier wave during the brief period when the waves are within a few degrees of the predetermined phase relationship, at which time the phase comparator output potential passes through zero. On the other hand, the time constant must be long enough that the variable reactance 11 does not lose control during those periods of zero input wave amplitude which exist when the input carrier wave is 100 percent modulated. A satisfactory time constant may easily be obtained by selection of proper values for the various circuit elements involved.

When the frequency of the local oscillator has been "locked in" at the frequency of the amplitude modulated input wave, the departure of the local oscillator frequency from the frequency predetermined by the values of the components of the frequency determining circuit 16 may be determined from the value of the reactance introduced into the frequency determining circuit 16 by the variable reactance 11. It has been found that this reactance may be measured from the average values of the characteristics of the pentode discharge device 22. For example, the average anode current, the average screen grid current, the screen grid voltage, or the bias voltage on the control grid of the discharge device 22 are related to the reactance of the circuit. In the present instance, the means for utilizing the value of the reactance are shown as comprising a voltmeter 51 connected through a variable resistance 52 between the screen grid 35 of the discharge device 22 and the pickoff arm of potentiometer 32 in the voltage divider that also includes resistance 33 and voltage regulator tube 31. As the current through the discharge device 22 varies to change the reactance of the circuit 11, the voltage on the screen grid 35 of the device also varies and the difference between that voltage and the fixed voltage from potentiometer 32 is indicated by the meter 51. The meter 51 may be calibrated directly in terms of frequency deviation from the known frequency of the local oscillator 10 when the output of the phase comparator 12 is zero. Such calibration is possible because the average operating characteristics of the pentode discharge device vary directly with the reactance of the reactance circuit 11, which also varies the frequency of the local oscillator. It has been found that when the frequency range of the local oscillator is approximately 15 kilocycles wide centered at approximately 500 kilocycles, a substantially linear relationship exists between the screen grid voltage and the frequency deviation of the local oscillator over a range of approximately 10 kilocycles. Of course, the meter 51 may indicate voltage, if desired, and any calibration charts may be used to convert the voltage reading to frequency deviation.

It is understood that the invention is not limited to the measurement of screen grid voltage but also contemplates the measurement of various other average operating conditions of the pentode discharge device 22, such as screen grid current, anode direct current or voltage, or control grid voltage, all of which are related to the flow of current through the device. In some instances, it may be desirable to replace the meter 51 with an input circuit for other electronic devices, so that frequency deviation of the amplitude modulated input wave will control those devices.

The apparatus may be initially aligned by utilizing a signal generator to provide input oscillations to the phase comparator having a predetermined or desired frequency, the departure from which is to be indicated by the apparatus. The variable capacitor 20 in the frequency determining circuit 16 of the local oscillator and the bias resistor 50 in the amplifier 13 may then be adjusted. The frequency indicating meter 51 may then be adjusted to its mid-scale or zero frequency deviation point by varying the position of the movable arm of potentiometer 32 and the sensitivity of the meter adjusted by means of variable resistor 52.

It is now apparent that the apparatus of the invention fulfills the objectives set forth and provides an improved means for determining and indicating the carrier frequency of an amplitude modulated radio wave. The amplitude modulation of the wave does not affect the accuracy of the apparatus, and the apparatus employs only one main frequency sensitive element. The departure of the carrier frequency of the wave from a predetermined value may be accurately indicated, and an alarm given if the frequency lies outside a predetermined range. Although only one embodiment of the invention has been illustrated, many modifications will occur to those skilled in the art. Therefore, it is understood that the appended claims cover all such modifications as fall within the true scope and spirit of the invention.

What I claim as new and desire to secure by Letters Patent of the United States is:

1. Apparatus for determining the frequency of a carrier wave comprising an oscillator having a frequency determining element, a variable reactance connected in circuit relationship with said frequency determining element for controlling the frequency of oscillations of said oscillator, means responsive to the phase difference between oscillations produced by said oscillator and said carrier wave for varying said reactance to maintain the oscillations produced by said oscillator and said carrier wave in predetermined phase relationship, and means for utilizing the reactance of said variable reactance as an indication of the frequency of oscillations of said oscillator.

2. Apparatus for determining the frequency of a carrier wave comprising an oscillator having a frequency determining element, a variable electronic reactance connected in circuit relationship with said frequency determining element for controlling the frequency of oscillations of said oscillator, means responsive to the phase difference between oscillations produced by said oscillator and said carrier wave for producing a potential which is related in amplitude to said phase difference, means for supplying said potential to said variable electronic reactance for varying the reactance thereof to maintain the oscillations produced by said oscillator and said carrier wave in predetermined phase relationship, and means for utilizing said reactance as an indication of the frequency of oscillations of said oscillator.

3. Apparatus for determining the frequency of a carrier wave comprising an oscillator having a frequency determining element, a variable reactance comprising an electron discharge device connected in circuit relationship with said frequency determining element for controlling the frequency of oscillations of said oscillator, means responsive to the phase difference between oscillations produced by said oscillator and said carrier wave for producing a potential related in amplitude to said phase difference, means for supplying said potential to said electron discharge device for varying said variable reactance to maintain the oscillations produced by said oscillator and said carrier wave in predetermined phase relationship, and means for utilizing the reactance of said variable reactance as an indication of the frequency of oscillations of said oscillator.

4. Apparatus for determining the frequency of a carrier wave comprising an oscillator having a frequency determining element, a variable reactance comprising an electron discharge device connected in circuit relationship with said frequency determining element for controlling the frequency of oscillations of said oscillator, means responsive to the phase difference between oscillations produced by said oscillator and said carrier wave for producing a potential related in amplitude to said phase difference, means for supplying said potential to said electron discharge device for varying the reactance thereof to maintain the oscillations produced by said oscillator and said carrier wave in predetermined phase relationship, and means for utilizing an average operating condition of said electron discharge device as an indication of the frequency of oscillations of said oscillator.

5. Apparatus for determining the frequency of a carrier wave comprising an oscillator having a frequency determining element, a variable reactance comprising an electron discharge device connected in circuit relationship with said frequency determining element for controlling the frequency of oscillations of said oscillator, means responsive to the phase difference between oscillations produced by said oscillator and said carrier wave for producing a potential related in amplitude to said phase difference, means for supplying said potential to said electron discharge device to vary the flow of current therethrough to vary the reactance thereof and thereby maintain the oscillations produced by said oscillator and said carrier wave in predetermined phase relationship, audio frequency sensitive means also connected to receive said potential for providing an alarm when said potential varies at an audio frequency rate, and means for utilizing an average operating condition of said electron discharge device that varies with the average current flowing therethrough as an indication of the frequency of oscillations of said oscillator.

6. Apparatus for determining the frequency of a carrier wave comprising an oscillator having a frequency determining element, a variable reactance comprising an electron discharge device connected in circuit relationship with said frequency determining element for controlling the frequency of oscillations of said oscillator, said electron discharge device having a control grid and a screen grid, means responsive to the phase difference between oscillations produced by said oscillator and said carrier wave for producing a potential whose amplitude is related to said phase difference, means for supplying said potential to said control grid to vary the current flowing through said electron discharge device to vary the reactance thereof and thereby maintain the oscillations produced by said oscillator and said carrier wave in predetermined phase relationship, audio frequency sensitive means also connected to receive said potential for providing an alarm when said potential varies at an audio frequency rate, and means for utilizing an average operating condition of said screen grid as an indication of the frequency of oscillations of said oscillator.

References Cited in the file of this patent

UNITED STATES PATENTS

| | | |
|---|---|---|
| 2,396,688 | Crosby | Mar. 19, 1946 |
| 2,406,125 | Ziegler | Aug. 20, 1946 |
| 2,564,205 | Hugenholz | Aug. 14, 1951 |
| 2,624,005 | Hansen | Dec. 30, 1952 |
| 2,730,620 | Schmitt et al. | Jan. 10, 1956 |
| 2,793,347 | Clark | May 21, 1957 |
| 2,802,899 | Sonnenfeldt | Aug. 13, 1957 |